(12) United States Patent
Bystrov et al.

(10) Patent No.: US 8,588,488 B2
(45) Date of Patent: Nov. 19, 2013

(54) GROUP-WISE IMAGE REGISTRATION BASED ON MOTION MODEL

(75) Inventors: Daniel Bystrov, Hamburg (DE);
Heinrich Schulz, Hamburg (DE);
Torbjoern Vik, Hamburg (DE); Stefan Matthias Florian Schmidt, Biebertal (DE)

(73) Assignee: Koninklijke Philips N.V., Eindhoven (NL)

( * ) Notice: Subject to any disclaimer, the term of this patent is extended or adjusted under 35 U.S.C. 154(b) by 252 days.

(21) Appl. No.: 13/146,661

(22) PCT Filed: Jan. 18, 2010

(86) PCT No.: PCT/IB2010/050217
§ 371 (c)(1),
(2), (4) Date: Jul. 28, 2011

(87) PCT Pub. No.: WO2010/092494
PCT Pub. Date: Aug. 19, 2010

(65) Prior Publication Data
US 2011/0280461 A1    Nov. 17, 2011

Related U.S. Application Data

(60) Provisional application No. 61/169,756, filed on Apr. 16, 2009, provisional application No. 61/151,600, filed on Feb. 11, 2009.

(51) Int. Cl.
*G06K 9/00* (2006.01)
*G06K 9/32* (2006.01)

(52) U.S. Cl.
USPC ............................ 382/128; 382/294; 382/131

(58) Field of Classification Search
USPC .............. 382/128–132, 294; 378/4, 8, 65, 69; 600/407, 428, 509, 513, 427
See application file for complete search history.

(56) References Cited

U.S. PATENT DOCUMENTS

| | | | |
|---|---|---|---|
| 2006/0074292 A1* | 4/2006 | Thomson et al. | 600/411 |
| 2008/0039713 A1* | 2/2008 | Thomson et al. | 600/411 |
| 2008/0101532 A1* | 5/2008 | Tkaczyk et al. | 378/8 |
| 2008/0279428 A1* | 11/2008 | Kaus et al. | 382/128 |
| 2008/0310760 A1* | 12/2008 | Carlsen et al. | 382/294 |
| 2010/0317967 A1 | 12/2010 | Carlsen et al. | |

FOREIGN PATENT DOCUMENTS

WO     2008081365 A2    7/2008

OTHER PUBLICATIONS

D. Sarrut, S. Delhay, P.-F. Villard, V. Boldea, M. Beuve, and P. Clarysse, "A Comparison Framework for Breathing Motion Estimation Methods From 4-D Imaging," IEEE Trans. Med. Imaging, vol. 26, No. 12, pp. 1636-1648, 2007.*
Klinder et al, Local Motion Analysis in 4D Lung CT Using Fast Groupwise Registration, Image Processing (ICIP), 2009 16th IEEE International Conference on.*
Shen et al, Consistent Estimation of Cardiac Motions by 4D Image Registration, MICCAI 2005, LNCS 3750, pp. 902-910, 2005.*

(Continued)

*Primary Examiner* — Andrae S Allison

(57) ABSTRACT

A method includes generating a set of group-wise registered images from a time sequence of images based on a region of interest of a subject or object identified in at least one of the images, the image sequence, and a motion model indicative of an estimate of a motion of the subject or object during which the image sequence is acquired.

20 Claims, 2 Drawing Sheets

(56) References Cited

OTHER PUBLICATIONS

Manfred Georg, Richard Souvenir, Andrew Hope, and Robert Pless, "Simultaneous data volume reconstruction and pose estimation from slice samples," in CVPR. 2008, IEEE Computer Society.*

Fan, L., et al.; Evaluation and Application of 3D Lung Warping and Registration Model Using HRCT Images; 2001; Proc. of the SPIE-Int'l Soc. for Optical Engineering; vol. 4321: 234-243.

Kaus, M. R., et al.; Assessment of a Model-Based Deformable Image Registration Approach for Radiation Therapy Planning; 2007; Int. J. Radiation Oncology Biol. Phys.; 68(2)572-580.

Li, P., et al.; Combination of Intensity-based Image Registration with 3D Simulation in Radiation Therapy; 2008; Phys. Med. Biol.; 53:4621-4637.

Sarrut, D., et al.; A Comparison Framework for Breathing Motion Estimation Methods from 4-D Imaging; 2007; IEEE Trans. on Medical Imaging; 26(12)1636-1648.

* cited by examiner

GROUP-WISE IMAGE REGISTRATION BASED ON MOTION MODEL

CROSS REFERENCE TO RELATED APPLICATIONS

This application claims the benefit of U.S. provisional application Ser. No. 61/151,600 filed Feb. 11, 2009 and U.S. provisional application Ser. No. 61/169,756 filed Apr. 16, 2009, both of which are incorporated herein by reference.

The following generally relates to image processing, and finds particular application to computed tomography (CT). However, it also amenable to other medical imaging applications and to non-medical imaging applications.

For imaging applications in which a structure of interest (e.g., a tumor, an organ, etc.) in a subject moves relative to the subject over time due to cyclic movement structure of the subject (e.g., the lungs), a four dimensional (4D) image sequence can be used to estimate the motion of the structure of interest during the movement cycle. One particular application where this is useful is radiotherapy treatment of a tumor in the lungs. In such an application, the tumor's relative position may vary over the respiratory cycle. For dose calculation purposes, the tumor's relative position over time should be taken into account and can be determined through a 4D image sequence.

With one 4D imaging technique, image projections and a respiratory signal are concurrently acquired during several motion cycles. The respiratory signal is time mapped to the data acquisition and is used to group image projections based on common respiratory phase. A three dimensional (3D) image set is then reconstructed over the different phases of the respiratory cycle. For radiotherapy dose calculations, the tumor of interest is then segmented in the different phases of the respiratory cycle. In one instance, the clinician segments the tumor in each image. Unfortunately, this can be a time consuming and tedious task as a study may have tens or hundreds of images.

In another instance, a pair-wise image based registration of adjacent images is utilized to propagate a contour representing the tumor iteratively from one image frame to the next. From the pair-wise registration, a motion map can be obtained over the respiratory cycle and can be used for estimating the motion of the structure. Unfortunately, pair-wise registration is susceptible to local image artifacts, which may lead to erroneous changes in shape and size in the images of the structure of interest. Alternatively, the contour can be propagated using an anatomical model in which active shape models of the structure of interest are propagated from one respiratory phase to the next. Similarly, anatomical model based propagation is susceptible to error, for example, due to differences between the anatomical model and the actual anatomy.

Aspects of the present application address the above-referenced matters and others.

According to one aspect, a method includes generating a set of group-wise registered images from a time sequence of images based on a region of interest of a subject or object identified in at least one of the images, the image sequence, and a motion model indicative of an estimate of a motion of the subject or object during which the image sequence is acquired.

In another embodiment, a system includes a region of interest identifier that identifies a region of interest in at least one image in a series of images of a moving object, a model bank that includes one or more models indicative of cyclical motion of the moving object, and a registration component that group-wise registers the images based on a motion model from the model bank.

In another embodiment, a computer readable storage medium containing instructions which, when executed by a computer, cause the computer to perform the acts of: obtaining a time series image sequence of a moving object or subject, obtaining a motion model indicative of motion of the object or subject, defining a region of interest in an image of the image sequence, and propagating the region of interest to one or more images in the image sequence based on a group-wise registration of the images with the motion model.

In another embodiment, a computer readable storage medium containing instructions which, when executed by a computer, cause the computer to perform the acts of: obtaining a time series image sequence of a moving object or subject, obtaining a motion model indicative of motion of the object or subject, defining a region of interest in an image of the image sequence, and group-wise registering the images based on the image sequence, the motion model and the region of interest.

The invention may take form in various components and arrangements of components, and in various steps and arrangements of steps. The drawings are only for purposes of illustrating the preferred embodiments and are not to be construed as limiting the invention.

The following generally relates to a group-wise registration of a sequence or time series of images of region of interest (ROI) of a subject or object based on a motion model that estimates or models the motion of the subject or object during data acquisition. Such a registration can mitigate gating artifact, which may occur in configurations in which a pair-wise, anatomical model based or other type of image registration is performed. As such, the registered images are well suited for automatically propagating the ROI, such as a contour, a mesh, or the like, identified in at least one image to one or more other images in the image sequence. Below, the group-wise registration is described in the context of CT imaging. However, it is to be appreciated that such a registration can also be employed in connection with other imaging modalities, such as MR, US, etc.

Figure 1:
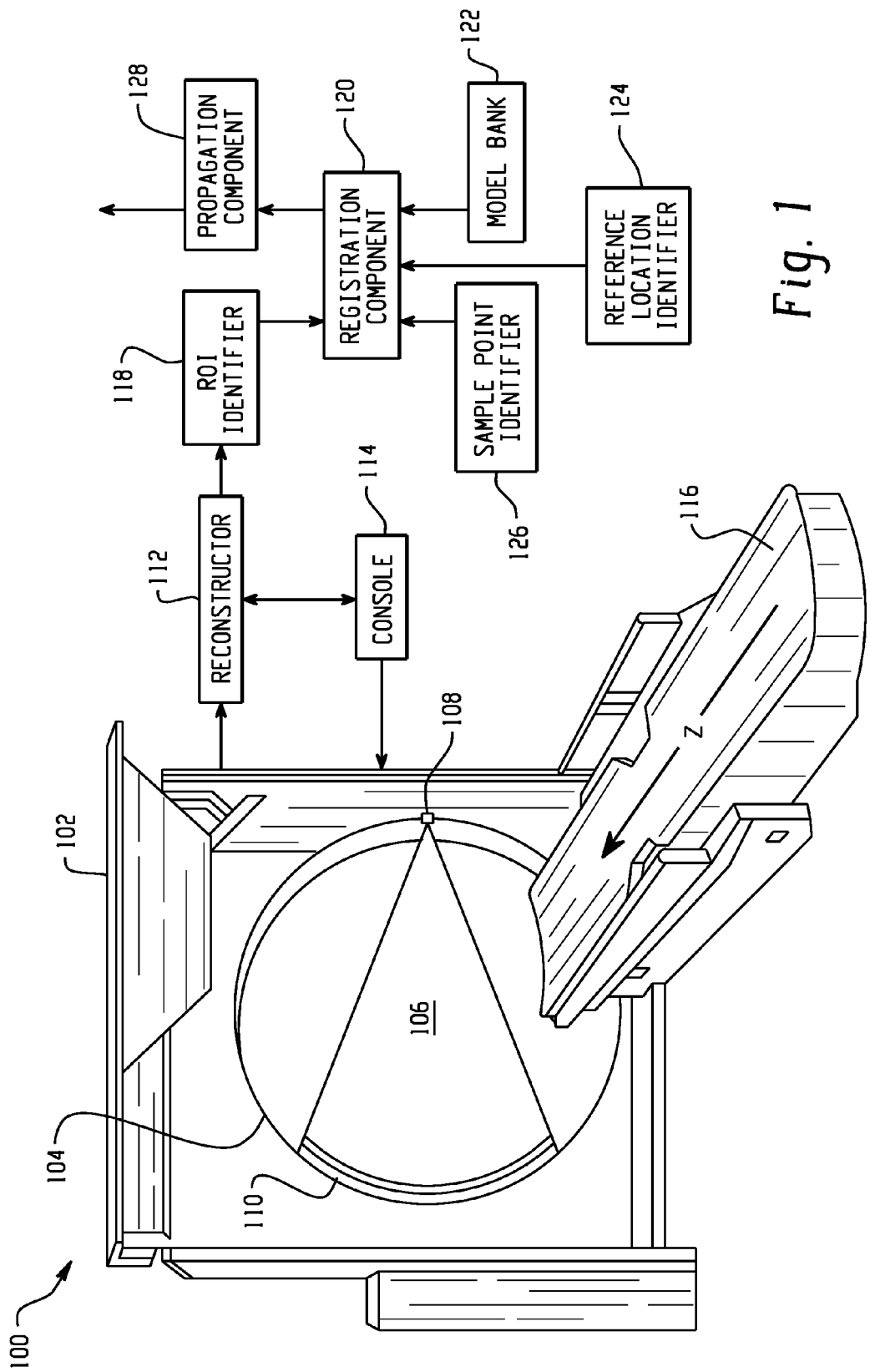
FIG. 1 illustrates an example imaging system.

FIG. 1 illustrates an imaging system or CT scanner 100. The imaging system 100 includes a stationary gantry 102 and a rotating gantry 104, which is rotatably supported by the stationary gantry 102 and rotates around an examination region 106 about a longitudinal or z-axis. A radiation source 108 such as an x-ray tube is supported by the rotating gantry 104 and emits radiation that traverses the examination region 106. A radiation sensitive detector array 110 subtends an angular arc opposite the radiation source 108 across the examination region 106 and detects radiation traversing the examination region 106. The detector array 110 generates a signal indicative of the detected radiation. A reconstructor 112 reconstructs the signal from the detector array 110 and generates volumetric image data indicative thereof. A general purpose computing system serves as an operator console 114. Software resident on the console 114 allows the operator to control the operation of the system 100. A patient support 116, such as a couch, supports an object or subject such as a human patient in the examination region 106.

In the illustrated embodiment, the imaging system 100 is used to generate a time sequence of images of a structure or region of interest of a subject or object that moves during a motion cycle over the motion cycle. For example, in one instance the system 100 is used to generate a sequence of gated 4D-CT images of a tumor, an organ, a gross target volume (GTV), etc. during one or more respiratory and/or cardiac cycles. Such an image sequence may include tens, hundreds, etc. number of images over a plurality of motion cycles.

A ROI identifier 118 identifies one or more ROIs in one or more image of the image sequence. The particular image can be manually selected by a user or automatically selected based on a predetermined protocol or otherwise. The selected image may be at or near one of the ends of the sequence, at or near the middle of the sequence, include a particular view of the structure of interest, etc. The ROI may be identified through various tools such as predefined contours (e.g., circles, rectangles, etc.) that can be resized, rotated and/or otherwise manipulated, a free-hand contour drawing tool, an automated contouring tools that contour based on voxel values, gradients, etc., and/or other tools.

A registration component 120 registers the images in the image sequence. As briefly noted above, this includes group-wise registering images based on the identified ROI(s), a suitable motion model, and the images. As described in greater detail below, in one instance the registration component 120 concurrently determines one or more free parameters of the motion model based on the entire or a predetermined sub-portion of the images, and locally group-wise registers the images based on the ROI and the motion model. In instances in which the ROI is identified in more than one image, the different ROIs can be weighted for the registration. The weights can be based on the spatial distance of ROIs (e.g., mesh-to-mesh distances) at corresponding times.

A model bank 122 includes one or more motion models, which model respiratory motion, cardiac motion and/or other motion. As described in greater detail below, such motion may be modeled as a plurality of cyclic trajectories, with one or more free parameters, that extend through the image sequence from a reference location. Such a model may be modeled as a Fourier series or other cyclic model. As briefly noted above, one or more free parameters of the motion model are determined based on the entire or a predetermined sub-portion of the images during registration.

A control point (or reference location) identifier 124 identifies a finite set of control points (or reference locations) about the ROI. Such points can be located outside the ROI, within the ROI and/or on the perimeter of the ROI. Using a software application, such points can be identified by clicking on a location on an image via a mouse or other pointing device or otherwise. The registration component 120 applies the model with one or more reference locations. For instance, a reference location can be used as an initial condition for determining the free parameters of the model and registering images.

A sample point identifier 126 identifies a finite set of points about a control point. The sample points can be employed to minimize or reduce the variability of the transported image information, for example, the average variance of the grey values in vicinity of the trajectories. A sample point can be manually or automatically identified, and generally is located within a vicinity of or near a corresponding reference location, such as within a predetermined distance of a corresponding reference location. The variability can be minimized between images using known techniques such as sum of squares, etc.

A contour propagation component 128 propagates the ROI to one or more of the registered images in the image sequence.

It is to be appreciated that the ROI can be located at one of the ends of the image sequence and propagated through the image sequence, located nearer a middle of the image sequence and propagated in both directions through image sequence, or alternatively located and propagated through the image sequence.

Figure 2:
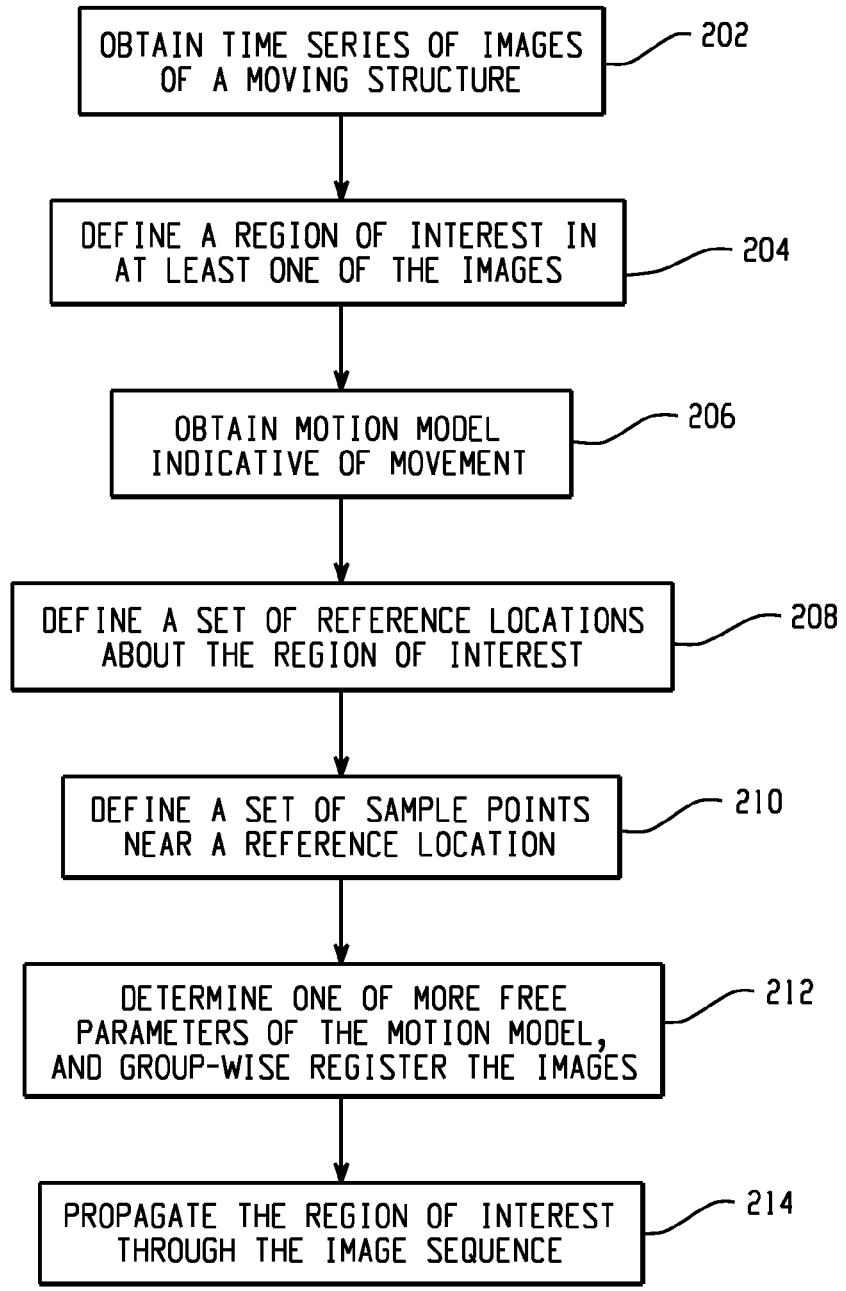
FIG. 2 illustrates an example method.

FIG. 2 illustrates a method of performing a group-wise registration based on a motion model. At 202, a time series of image of structure of interest during one or more motion cycles is obtained. As noted above, the time series can be generated with data acquired by a CT, MRI, US, or other imaging scanner. An example of such a series is a series of images of a tumor or other structure of interest in the lungs over one or more respiratory cycles. At 204, a ROI is defined in at least one of the images. This may include identifying a ROI that represents the tumor or other structure.

At 206, a suitable motion model is obtained. As described herein, such a motion model may be cyclic and define trajectories though the patient. At 208, a set of reference locations or control points is defined about the ROI. Each control point provides a point through which each trajectory extends through the image sequence. At 210, a set of sample points is defined in the vicinity of the control points and used to decrease or minimize the variability along a trajectory. At 212, one or more free parameters of the motion model are determined based on the ROI, the set of reference locations, the set of sample points, and/or the images, and the images are group-wise registered based on the motion model. At 214, the ROI is propagated to one or more images in the registered image sequence.

The following discusses a non-limiting example. For explanatory purpose, the discussed motion model is a periodic tempo-spatial model. However, other models are also contemplated herein.

In the illustrated model, the trajectory through the image sequence is approximated in a finite dimensional space using a Fourier-series of order $N_{\mathscr{F}}$ as a function of EQUATIONS 1 and 2:

$$\gamma(x; t) = c(x) + \sum_{i=1}^{2NF} \Phi_i(t)\theta_i(x), \text{ and} \qquad \text{EQUATION 1}$$

$$\gamma(x; 0) = x, \qquad \text{EQUATION 2}$$

where $$\Phi_{2i-1}(t) := \sin\left(\frac{2\pi t}{i}\right), i \in \{1, \ldots, N_{\mathscr{F}}\},$$

$$\Phi_{2i}(t) := \cos\left(\frac{2\pi t}{i}\right), i \in \{1, \ldots, N_{\mathscr{F}}\}, \text{ and}$$

$$c(x), \theta_i(x) \in \mathfrak{R}^d, \text{ and}$$

$c(x)$ represents a center of a trajectory, x represents a starting point of a trajectory, and $\theta_i(x)$ represent free parameters of the model.

A finite set of centers $C \subset \mathfrak{R}^d$ is selected and used to compute a trajectory with a center c for a point x, allowing for a registration that is independently formulated from the selected starting time as a function of EQUATION 3:

$$c(t) := \tilde{\gamma}(x(c), t) = c + \sum_{i=1}^{2NF} \Phi_i(t)\theta_{i,c}, \quad \text{EQUATION 3}$$

where $$\theta_{i,c} := \theta_i(x(c)), \text{ and}$$

$$x(c) = c - \sum_{i=1}^{2NF} \Phi_i(0)\theta_{i,c}.$$

Numerical approximations of trajectories associated with the centers C can be defined by $M:=2N\mathscr{F}(d)(|C|)$ parameter $\theta_{i,c}$, which are the free spatial parameters for the group-wise image registration. For a given time t and a parameter set $\theta \in \mathfrak{R}^M$, a center $c \in C$ can be located at the location $c(t) \in C(t)$, which are the set of centers mapped by EQUATION 3 at time t.

For other points in $\mathfrak{R}^d \backslash C$, motion points can be described via interpolation such as thin plate spline interpolation between the centers C and their images C(t) or otherwise. By way of non-limiting example, for a subset $X \subset \mathfrak{R}^d$ and a set of corresponding images $y(x) \in Y \subset \mathfrak{R}^d$, a thin plate spline (TPS) interpolation can be denoted as a function of EQUATION 4:

$$TPS_X \mapsto_Y: \mathfrak{R}^d \mapsto \mathfrak{R}^d, \quad \text{EQUATION 4}$$

which is defined by the set of nodes X and images Y. Using this notation, the trajectories of the other points $s \in \mathfrak{R}^d$ can be interpolated as a function of EQUATION 5:

$$S(t) := TPS_C \mapsto_{C(t)}(s). \quad \text{EQUATION 5}$$

One approach to stabilizing a thin-plate spline interpolation is to assume that the corner points of the image are stationary.

The choice of the centers C may vary. In the illustrated embodiment, the centers C are selected based on the regions of interest to be tracked over the motion cycle. In one instance, the centers C can be uniformly generated within a predetermined vicinity of the ROI. These centers can be created by generating a large number of points (e.g., one thousand) and clustering the points with a k-means algorithm to generate one to fifty centers.

If the images are from the same modality and the same acquisition, the observations can be considered to be normally distributed at discrete positions in the space of trajectories. Given a set of discrete positions $S \subset \mathfrak{R}^d$, the gray value I(s) at position $s \in S$ is a random variable that follows $\mathcal{N}(\mu(s); \sigma^2)$, with the unknown mean or average value $\mu(s)$ and unknown variance $\sigma^2$. At other positions $\mathfrak{R}^d \backslash S$, the gray value can be considered to be uniformly distributed $\mathcal{U}(v_{min}; v_{max})$. Such a model considers a local set of points in the registration.

The set of discrete and irregularly distributed sample points S are selected in a local neighborhood to the trajectory centers and are indicative of information about the trajectory. This allows for modeling a sub-portion of the image, for example, only a relevant part of the image such as only points inside particular anatomy. In the illustrated embodiment, the sample points are randomly selected from a uniform distribution around the trajectory centers and inside a perimeter of the particular anatomy. In another embodiment, the sample points are otherwise selected, for example, based on a learned system and/or an optimization. Note that the sample points move on trajectories through space that may not have the form of EQUATION 1.

The observation of two gray values at two disjoint positions can be considered to be independent. The distribution of the transformed random variable I(T) by a bijective transformation T (e.g., by parameterization) is uniform except at the positions $x \in \mathfrak{R}^d$, where $T^{-1}(x) \in S$. At these positions, I(T) follows a normal distribution. Assuming that the observed images $\{I_t\}$ at the given time-points $t \in T := \{t_1; \ldots, t_{NT}\} \subset [0; 1]$ satisfy the sampling criterion and that each image is an independent sample from the above distribution, the probability of observing a given gray value, or the likelihood, is a function of EQUATION 6:

$$\mathcal{L}(\{I_t\} | \{T_t\}) = \prod_{x \in \Omega} \prod_t p(I_t | x, \{T_t\}) \quad \text{EQUATION 6}$$

$$= \prod_{x \in \Omega} \prod_t p(I_t(T_t^{-1}) | x)$$

$$= \prod_{s \in S} \prod_t p(I_t(T_t^{-1}) | s) + \text{constant}.$$

where the constant sums up the likelihood at all positions where the distribution is uniform and is independent of $T_t$. The negative log likelihood yields EQUATION 7:

$$-\log \mathcal{L}(\{I_t\} | \{T_t\}) = \quad \text{EQUATION 7}$$

$$\frac{1}{2\sigma^2} \sum_{s \in \Omega} \sum_t \|I_t(T_t^{-1}(s)) - \mu(s)\|^2 + \text{constant}.$$

Minimizing EQUATION 7 with respect to the average trajectory gray value $\mu(s)$ yields EQUATION 8:

$$\hat{\mu}(s) = \frac{1}{N_T} \sum_t I_t(T_t^{-1}(s)). \quad \text{EQUATION 8}$$

Substituting EQUATION 8 for $\mu(s)$ in EQUATION 7 optimizes EQUATION 7 with respect to the parameters $\theta \in \mathfrak{R}^M$ of the transformations $\{T_t\}$. The optimization can be achieved using a Levenberg-Marquardt or other optimization scheme. For this, the negative log-likelihood can be derived in dependence on the gradient of the image at the sample points S. The gradient can be locally estimated at these positions numerically and/or otherwise. The above allows for explicit modeling of trajectories and the formulation of a local similarity measure (image likelihood). Before running the algorithm, one or more of the images can be down-sampled.

In another embodiment, a time-dependent breathing model is employed. This takes into account that breathing generally is not a sinusoidal movement. In yet another embodiment, sliding surfaces are employed, which facilitate mitigating certain registrations like with the lung where the deformation field is discontinuous at the lung walls, as the ribs and spine show no or low movement whereas the tissue inside the lung show large movement.

The approach described herein, as well as other approaches and/or variants, can be used in the context of time dependent acquisitions such as breathing motion in 4D-CT imaging for radio therapy planning for radiation planning workstations, 4D-MR imaging, 4D-MR/CT imaging, etc.

The above can be implemented as a console application of a scanner and/or an image processing or planning workstation. By way of example, the above may be implemented by way of computer readable instructions, which when executed by a computer processor(s) (a processor of the console or workstation), cause the processor(s) to carry out the described acts. In such a case, the instructions are stored in a computer readable storage medium associated with or otherwise accessible to the relevant computer. The acts need not be performed concurrently with data acquisition.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method, comprising:
   defining a set of reference locations about a region of interest of a subject or object, which is identified in at least one image from a time sequence of images;
   defining a set of sample points about a reference location of the set;
   applying a motion model to the reference location of the set, wherein the motion model is indicative of a trajectory through the image sequence; and
   generating a set of group-wise registered images from the time sequence of images by concurrently registering the time sequence of images based on the model applied to the reference location of the set while minimizing variability of transported image information based on the set of sample points.

2. The method of claim 1, wherein the trajectory extends through the time sequence of image sequence.

3. The method of claim 1, wherein the trajectory estimates image-to-image motion of the reference location through the image sequence.

4. The method of claim 1, wherein
   minimizing the variability includes minimizing an average trajectory gray value.

5. The method of claim 1, wherein minimizing the variability includes minimizing an average variance of a gray value within a predetermined distance of the trajectory through the image sequence.

6. The method of claim 1, wherein the motion model is based on cyclic motion.

7. The method of claim 1, wherein the motion model includes one or more free parameters, and further including determining the one or more free parameters based on the images during registration.

8. The method of claim 1, further comprising propagating the region of interest through the group-wise registered image sequence.

9. The method of claim 1, wherein the motion model models at least one of a respiratory or a cardiac cycle.

10. The method of claim 1, wherein the group-wise registration is local to the region of interest.

11. A system, comprising:
    a region of interest identifier that identifies a region of interest in at least one image in a series of images of a moving object;
    a reference location identifier that identifies a plurality of reference locations about the region of interest;
    a sample point identifier that identifies a plurality of sample points about a reference location of the plurality of reference locations;
    a model bank that includes one or more models indicative of cyclical motion of the moving object; and
    a registration component that group-wise registers the images based on a motion model from the model bank and the images by applying the motion model to the images at the reference location of the reference locations and concurrently registering the series of images, wherein the motion model is indicative of a cyclic trajectory through the series of images,
    wherein the registration component minimizes a variability of transported image information for the reference location based on the plurality of sample points.

12. The system of claim 11,
    a reference location identifier wherein the model includes at least one free parameter, and the registration component determines the free parameter based on the reference location.

13. The system of claim 12, wherein minimizing the variability includes minimizing an average variance of a gray value within a predetermined distance of the trajectory through the image sequence.

14. The system of claim 13, further comprising:
    a region of interest propagator that propagates the region of interest through the registered image sequence.

15. The system of claim 11, wherein the registration mitigates gating artifact of pair-wise, anatomical model based image registration.

16. A non-transitory computer readable storage medium containing instructions which, when executed by a computer, cause the computer to perform the act of:
    obtaining a time series image sequence of a moving object or subject;
    obtaining a motion model indicative of motion of the object or subject;
    defining a region of interest in an image of the image sequence;
    defining a set of sample points about a reference location; and
    propagating the region of interest to one or more images in the image sequence based on a group-wise registration of the images with the motion model, wherein the registration includes applying acyclic trajectory motion model through the time series image sequence from the reference location about the region of interest and concurrently registering the images and minimizing a variability of transported image information for the reference location based on the set of sample points.

17. The computer readable storage medium of claim 16, wherein the motion model models at least one of a respiratory or a cardiac cycle.

18. The computer readable storage medium of claim 17, further containing instructions which, when executed by the computer, cause the computer to perform the act of: determining a free parameter of the motion model based on the reference location.

19. The computer readable storage medium of claim 18, wherein minimizing the variability includes minimizing an average variance of a gray value within a predetermined distance of the trajectory through the image sequence.

20. The computer readable storage medium of claim 18, wherein the region of interest is located at a middle of the image sequence and propagated in both directions through image sequence.

* * * * *